United States Patent [19]

Carter

[11] 4,249,608

[45] Feb. 10, 1981

[54] POLYMER-CONTAINING FLUID AND AN OIL RECOVERY METHOD USING THE FLUID

[75] Inventor: Walter H. Carter, Houston, Tex.

[73] Assignee: Texaco Inc., White Plains, N.Y.

[21] Appl. No.: 37,587

[22] Filed: May 9, 1979

[51] Int. Cl.³ .......................................... E21B 43/22
[52] U.S. Cl. .................................. 166/275; 166/246; 166/273; 252/8.55 D
[58] Field of Search ............... 166/273, 274, 275, 246, 166/305 R; 252/8.55 D

[56] References Cited

U.S. PATENT DOCUMENTS

| | | | |
|---|---|---|---|
| 3,141,818 | 7/1964 | Stephens et al. | 252/8.55 D X |
| 3,160,205 | 12/1964 | Harvey et al. | 252/8.55 D X |
| 3,206,398 | 9/1965 | Marlowe et al. | 252/8.55 D |
| 3,329,610 | 7/1967 | Kreuz et al. | 166/275 |
| 3,415,936 | 12/1968 | Hitzman | 252/8.55 D X |
| 3,482,631 | 12/1969 | Jones | 166/275 X |
| 3,605,893 | 9/1971 | Dauben | 166/273 |
| 3,854,532 | 12/1974 | Braden, Jr. | 166/273 X |
| 3,868,999 | 3/1975 | Christopher | 166/305 R X |
| 3,956,145 | 5/1976 | Christopher, Jr. et al. | 166/275 X |
| 4,046,196 | 9/1977 | Brown et al. | 166/273 |

Primary Examiner—James A. Leppink
Assistant Examiner—George A. Suchfield
Attorney, Agent, or Firm—Carl G. Ries; Robert A. Kulason; Jack H. Park

[57] ABSTRACT

Disclosed is an improved viscous, aqueous, hydrophilic polymer-containing fluid suitable for injection into porous media such as subterranean petroleum-containing earth formations and an oil recovery method in which the aqueous fluid is injected into the subterranean petroleum-containing formation. The fluid contains an effective amount of an aromatic treating substance, preferably benzene, toluene, xylene, and low alkyl-substituted benzene or toluene. The improvement resulting from incorporation of this additive in the polymer fluid includes greatly increased resistance to microbial degradation of the polymer, improved screen factor, and improves the injectivity of the fluid.

11 Claims, No Drawings

POLYMER-CONTAINING FLUID AND AN OIL RECOVERY METHOD USING THE FLUID

FIELD OF THE INVENTION

This invention concerns an improved viscous fluid and an enhanced oil recovery process using the fluid. More particularly, this improvement concerns a viscous, aqueous, hydrophilic polymer-containing fluid, the fluid containing an aromatic additive which protects the polymer from bacterial attack and improves the injectability of the fluid and reduces plugging sometimes experienced when similar fluids are injected into subterranean formations.

BACKGROUND OF THE INVENTION

Persons skilled in the art of recovering oil or petroleum from subterranean formations ordinarily employ socalled primary recovery techniques first, so long as oil may be recovered under acceptable economic conditions thereby. Once primary production is no longer economically feasible, some form of supplemental or enhanced recovery is applied to the subterranean formation. One of the earliest used and most popular forms of enhanced recovery is water injection, in which either fresh water or brine is injected into the subterranean formation to displace or push the residual oil through the formation toward a spaced-apart production well, from which it is recovered to the surface of the earth. Since the viscosity of the oil present in the subterranean formation is usually higher than the viscosity of water or other aqueous fluids injected into the formation, there is a strong tendency for the more mobile (less viscous) aqueous fluid to bypass a substantial portion of the oil. This is sometimes referred to in the literature as viscous fingering. The result is that only a portion of the residual oil is displaced by the aqueous fluid.

This problem has been recognized by persons skilled in the art of oil recovery, and various literature references describe methos for increasing the ability of the flooding medium to displace residual oil. It is well known in the art of oil recovery and described in the literature pertaining thereto that incorporation of sufficient amount of certain polymeric materials in the aqueous flooding medium to increase the viscosity thereof to a value more nearly equal to or greater than the viscosity of the oil, reduces or eliminates the tendency for the injected aqueous fluid to bypass or finger through the residual oil in the formation. Many substances have been disclosed in the literature for incorporation in the flooding medium for the purpose of increasing the viscosity of the injected fluid. U.S. Pat. No. 2,827,964 and U.S. Pat. No. 3,039,529 describe the use of high molecular weight, partially hydrolyzed polyacrylamides as thickening agents for aqueous fluids employed in oil recovery operations. U.S. Pat. No. 3,581,824 describes the use of heteropolysaccharides produced by fermentation of carbohydrates by bacteria of the genus Xanthomonas for the same purpose.

It is important to recognize the difference between the effect achieved by injecting a viscous, hydrophilic polymer-containing fluid into a formation as contrasted to injecting an aqueous fluid containing a surface active agent, i.e., a surfactant. The surfactant-containing fluid decreases the interfacial tension between the residual oil and the flooding medium in the flow channels through which the fluid passes, and will therefore reduce the residual oil in the portion of the formation contacted by the injected surfactant fluid. A fluid containing any of the hydrophilic polymers normally used for viscous flooding oil recovery methods does not reduce the interfacial tension between residual oil and the injected aqueous medium, and so does not reduce the oil saturation in the flow channels through which it passes. The purpose for using a hydrophilic polymer-containing fluid is to increase the number of flow channnels contacted by the injected fluid, or to improve the volumetric sweep efficiency of the oil recovery method. It is common practice to employ both a surfactant solution and a viscous, hydrophilic polymer-containing fluid in an optimum state-of-the-art chemical flooding process, although either may be used alone without the other.

Aqueous fluids containing suffienct hydrophilic polymer to increase the viscosity thereof to a value equal to or greater than the oil viscosity for the purpose of increasing the volumetric sweep efficiency, are commonly referred to in the art as mobility control or mobility buffer fluids. The ability of the various classes of polymers employed in mobility control fluid to produce the desired increase in the viscosity of the injected fluid depends on various factors including the salinity of the aqueous fluid present in the formation, the physical and chemical characteristics of the formation, and the nature of the residual oil.

It is recognized by persons skilled in the art of enhanced oil recovery processes employing mobility control fluids, that numerous problems are encountered in the use of these fluids. Injectivity problems are sometimes encountered due to improper hydration of the polymer, bacterial growth and other contaminants.

Another important property of an aqueous mobility control fluid relating to the flow resistance of the polymer fluid through a porous medium such as a permeable, subterranean oil-containing earth formation is recognized and a "screen factor" has been defined, which relates to the ability of the fluid to flow under such conditions. The screen factor is a measure of the viscoelastic behavior of the polymer fluid.

Another serious problem which has been recognized as occuring in the use of all of the hydrophilic polymers described in the literature for use in mobility control fluids, is bacterial degradation of the polymer contained in the fluid, which causes loss in fluid viscosity. It is not unusual for fluids injected into subterranean earth formations for oil recovery purposes to remain in the formation for many months or even years, and so the fluid properties will be adversely affected even though the rate of bacterial decomposition of the polymer is relatively slow. Many methods have been described in the literature for reducing the problem associated with bacterial decomposition of hydrophilic polymers, but most which have been described heretofore are either of limited effectiveness or are prohibitively expensive.

DESCRIPTION OF PRIOR ART

U.S. Pat. No. 3,410,342 describes the use of organic materials including benzene, toluene, or xylene to stabilize the miscibility of the components of a surfactant fluid.

U.S. Pat. No. 3,800,877 describes the use of aldehydes such as formaldehyde as an oxygen scavenger and bactericide for a polymer fluid.

SUMMARY OF INVENTION

The present invention concerns a method of treating an aqueous, hydrophilic polymer-containing fluid with an affective amount of an aromatic material.

The aromatic treating materials afford a very high degree of protection against bacterial decomposition of the hydrophilic polymer, thereby preventing decrease in fluid screen factor and viscosity. The affective aromatic materials include benzene, toluene, xylene, and $C_1$-$C_5$ alkyl-substituted benzene and toluene.

DESCRIPTION OF THE PREFERRED EMBODIMENTS

The present invention cencerns an improved aqueous fluid containing a viscosifying amount of a hydrophilic polymer, which fluid exhibits more stable injectivity characteristics, and the screen factor and viscosity remain constant over longer periods of time since the fluid is more resistent to attach by bacteria present in oil field brines or from surface contamination than presently-used fluids. The fluid is especially suitable for use in an oil recovery method in which the aqueous mobility control fluid is injected into the formation for the purpose of increasing the volumetric efficiency of the displacement process. The fluid may be used as substantially the only fluid injected into the formation, or it may be used in combination with, preferably immediately after injection of, an aqueous fluid containing a surface active agent or surfactant, which reduces the residual oil saturation in the portion of the formation contacted by the surfactant fluid. The fluid injected into the formation may contain at least one surfactant and at least one polymer.

One preferred class of hydrophilic polymers suitable for use in carrying out the present invention, include ionic polysaccharides such as those available commercially which are produced by fermentation of carbohydrates by bacteria of the genus Xanthomonas. Examples of such heteropolysaccharides are those produced by action of *Xanthomonas Campestris, Xanthomonas Begonia, Xanthomonas Phaseoli, Xanthomonas Hederae, Xanthomonas Incanae, Xanthomonas Carotae,* and *Xanthomonas Translucens*. Of these, the preferred species is ionic polysaccharide B-1495, which is prepared by culturring the bacterium Xanthomonas Campestris in NRRL B-1459, U.S. Department of Agriculture, on a well aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the tradename Xanflood ® 9702 from Kelco Company. Production of this and related heteropolysaccharides is well described in Smiley, K. L. "Microbia Polysaccharide--A Review", *Food Technology* 29,9:112-116 (1966) and in Moraine, R. A., Rogovin, S. P., and Smiley, K. L. "Kinetics of Polysaccharide B-1459 Synthesis", *J. Fermentation Technology,* 44, page 311-132 (1966). Other fermented polymers used for oil recovery such as that produced by the fungus species sclerotium may be used in this invention.

Another preferred class of hydrophilic polymer which may be employed beneficially in the fluiding process of this invention includes the commercially available, water soluble high molecular weight, unhydrolyzed or partially hydrolyzed polyacrylamides having molecular weights in the range of above $0.2 \times 10^6$, preferrably from $0.5 \times 10^6$ to $40 \times 10^6$, and more preferrably from $3 \times 10^6$ to $10 \times 10^6$. Copolymers of acrylamide and acrylic acid within the same molecular weight range, may also be used. If the polymer employed is a partially hydrolyzed polyacrylamide, up to about 70% and preferably from 12 to 45% of the carboxylamid groups are hydrolyzed to carboxyl groups. A number of partially hydrolyzed polyacrylamides and or co-polymers of acrylamide and acrylic acid are available commercially and commonly employed for mobility control buffer fluid formulation. These include, for example, materials marketed by the Dow Chemical Company under the trade name "Pusher 700" and "Cyanatrol" available from American Cyanamid.

Naturally occurring polymers may also be employed as the hydrophilic polymer in this process. Included in this class of effective materials are Guar gum, Locus Bean Gum, natrual starches and derivatives thereof, cellulose and its derivatives including hydroxy ethyl cellulose.

Any of the above described materials may be employed as the only hydrophilic polymer present in the mobility control fluid utilized in the oil recovery process aspect of this invention. It is well recognized that under certain conditions, improved results are obtained when a combination of two or more of the above-described hydrophilic polymers are utilized in an aqueous fluid for oil recovery purposes, and it is contemplated that this combination of polymers is within the scope of the present invention.

In preparing the aqueous polymer-containing fluid according to the process of this invention, one or more of the above described hydrophilic polymers are dissolved in water in any suitable fashion in order to provide an aqueous liquid having the desired viscosity. In oil recovery processes, it is sometimes desirable to prepare the aqueous fluid in a moderate salinity brine whose salinity is about equal to the salinity of the water remaining in the formation at the time the fluid is to be injected thereinto. Since the salinity of the fluid affects the viscosity obtained from any particular concentration of hydrophilic polymer, great care must be taken to ensure that the resulting fluid viscosity is sufficient to provide the desired beneficial mobility ratio between the injected fluid and the residual oil present in the formation. One effective method for preparing fluids for injection into high salinity formations, including processes employing use of surfactant fluid injection, is to prepare the mobility fluid using relatively fresh water, or in water whose salinity is at least significantly less than the salinity of the brine present in the formation at the time the fluids are injected thereinto.

The concentration of polymer mixed with water or brine to form the viscous aqueous fluid can vary over a fairly wide range, from about 50 parts per million to about 5 weight percent, although the preferred range is ordinarily from about 500 parts per million to about 3000 parts per million. The controlling parameters are the resultant viscosity of the solution, rather than any particular concentration, since the viscosity produced by addition of the polymer varies with numerous factors. For oil recovery purposes, the controlling factor should be, that the mobility of the mobility buffer fluid is less than the mobility of the residual oil present in the formation under formation conditions. Ordinarily this requires that the viscosity of the polymer fluid be equal to or greater than the viscosity of the residual oil, although other factors are well recognized in the literature pertaining to polymer flooding oil recovery methods, and it is sometimes possible to formulate an aqueous polymer fluid having the desired mobility (less than the mobility of the oil present in the formation) even though the viscosity of the polymer fluid is somewhat less than the viscosity of the petroleum. The viscosities of polymer fluids commonly employed for oil recovery purposes can range anywhere from several centipoise to several hundred centipoise.

The total volume of polymer solution prepared and injected into a formation in practicing this invention is in the range of from about 0.05 to 1.0 pore volumes and preferrably from 0.2 to 0.5 pore volumes based on the pore volumes of the oil containing formation to be swept by the oil recovery fluid. Of course, injection of larger amounts of polymer fluid will not decrease the amount of oil recovered, but the increased cost will make the economics of the process quite unsatisfactory. It is common practice to inject one or more slugs of polymer-containing fluid into the formation and to displace that through the formation by injecting field brine or other less expensive drive fluid. It is also recognized that the concentration of polymer may be decreased in a continuous or step wise fashion from the initial value to 0, thereby obtaining continuously efficient displacement of the polymer fluid by the subsequently-injected drive fluid.

The additive incorporated in the polymer containing resistance to bacterial degradation is an aromatic compound having the following formula:

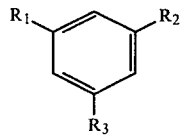

wherein $R_1$, $R_2$, and $R_3$ are each hydrogen or $C_1$ to $C_5$ and preferably $C_1$-$C_3$ alkyl with the total number of carbon atoms in $R_1$, $R_2$ and $R_3$ being from 0 to 5 and preferably from 0 to 3. Examples of preferred operable species are:
benzene
toluene
xylene
ethyl benzene
propyl benzene
propyl toluene
butyl benzene
butyl toluene The concentration of any one or more of the above described additives should be in the range from 0.001 to 0.2 and preferably from 0.005 to 0.15 percent by volume. The above described additive may be incorporated in the water prior to adding the polymer thereto, or it may be added simultaneously with the polymer, or it may be added to the fluid after the polymer has been dissolved and or dispersed in the water. It is understood that the above-stated concentration range exceeds the solubility of some of the aromatic compounds described above, particularly the alkylsubstituted benzenes or toluene. I have found that the amount of aromatic compound added to the polymer fluid may exceed the solubility without adverse effects of fluid properties. The excess aromatic material is dispersed or emulsified in the aqueous phase. The presence of excess, undissolved bactericide is sometimes an advantage, since loss of aromatic compound from the polymer fluid may occur in the formation, and in such case, the excess aromatic bactericide then dissolves in the fluid, thereby maintaining the concentration of dissolved bactericide sufficiently high to maintain the bactericidal action.

As mentioned previously, the polymer fluid prepared according to this invention may be injected into the formation via one or more injection wells and displaced away from the wells by injecting field brine or suitable drive fluid, without injecting any other fluids. This process will improve the volume of formation swept by the injected fluid, but will not ordinarily reduce the oil saturation in the pore spaces and flow channels of the formation contacted by the fluid. This process will, however, by virtue of contacting greater volumes of formation, recover more oil than could be recovered under ordinary circumstances using water injection alone. Still greater oil recovery is possible if the viscous fluid is employed in combination with a fluid which reduces the oil saturation in the portions of the formation through which the fluid passes, such as an aqueous fluid containing one or more effective surfactants, or a miscible fluid such as a hydrocarbon, or an emulsion or micellar dispersion comprising both an aqueous surfactant-containing phase and a hydrocarbon phase, all of which are well described in the literature pertaining to enhanced oil recovery methods. The polymer and surfactant may also be incorporated in one fluid.

The invention will be further described by the following examples, which are illustrative of specific modes of practicing the invention but are not intended to be in any way limitative of the scope of the invention which is defined by the appended claims.

FIELD EXAMPLE

For the purpose of illustrating a typical perferred method of applying the process of the invention to a subterranean oil containing formation, the following field example is described.

A subterranean petroleum-containing formation is located at a depth of 4700 feet, and the average thickness of the formation is 38 feet. The porosity is 42% and the permeability is 125 millidarcies. The oil contained in the formation is 20° API gravity crude. This formation has been produced by primary production processes until the oil production rate has declined and the water-oil ratio has increased to a point at which further oil production is economically unfeasible.

The salinity of the water present in the formation is approximately 1200 parts per million total dissolved solids including 120 parts per million divalent ions, principally calcium. It is determined that a suitable mobility control fluid for ensuring a favorable mobility ratio between an injected fluid and the residual oil in the formation can be prepared using field water whose salinity is 800 parts per million total dissolved solids, and having dissolved or dispersed therein approximately 1000 parts per million of a commercially available partially hydrolyzed polyacrylamide. To this is added 1000 parts per million toluene to prevent bacterial decomposition of the fluid, to ensure a desireable screen factor, and to ensure that no injectivity problems will be encountered during the time the fluid is being injected into the formation.

Although the total field comprises a number of five spot patterns, only one will be considered for this field example. The wells are located on the corners of a square, each side being approximately 120 feet in length, and with an injection well centered at about the center of each square grid. It is known that the total volumetric efficiency of an oil recovery process using a polymer fluid in this type pattern is about 80%. Accordingly, the pore volume of formation to be contacted by injected fluid in each grid unit is:
120×120×38×0.42×0.8=183,859 square feet One pore volume is equivalent to 1,375,000 gallons of fluid.

The slug size of mobility buffer fluid employed in this test is approximately 0.05 pore volumes or 5 pore volumes percent. Accordingly, the volume of the mobility buffer fluid is 68,772 gallons. This quantity of relatively fresh water (salinity equal 800 parts per million total dissolved solids) is utilized for preparing the fluid. The amount of polymer required to produce an average concentration of 1000 parts per million in this quantity of fluid is 573 pounds. The same weight of toluene is added to the fluid at the same time the polymer is added, and the fluid is mixed sufficiently to produce a homogeneous fluid.

In this particular application, no surfactant or other oil recovery agent is employed, and the polymer fluid is injected into the formation and followed by injecting field brine of approximately 1500 parts per million total dissolved solids. Brine injection is continued until the fluid being recovered from the production well is in excess of 99% by volume water, indicating that substantially all of the oil that can be recovered economically by this process has been recovered.

EXPERIMENTAL SECTION

The following laboratory tests were performed to demonstrate the benefits achieved by treatment of an aqueous polymer-containing fluid with the aromatic treating compounds according to the process of this invention.

In the first series of experiments, the ability of xylene to inhibit microbial growth in Xanflood polymer was studied. A solution comprising 10,000 gm/m³ (1.0% by weight) Xanflood®, a biopolymer, was prepared in deionized water. Xylene was added to two samples of the concentrated polymer solution, and the concentrate was stored for a period of 5 days at room temperature. The concentrated polymer solution was then diluted with 800 parts per million total solid brine to obtain a polymer concentration of 1,000 gm/m³ (1,000 parts per million). The fluid viscosity of the diluted samples was measured, for the purpose of determining the rate of viscosity loss of the polymer fluid which indicates the rate at which the polymer in the concentrate has been decomposed by bacterial action. Three concentrate samples were studied, all containing 10,000 gm/m³ polymer, with xylene concentrations of 0, 1,000 and 3,000 parts per million. The following data were obtained:

TABLE I

INHIBITION OF MICROBIAL GROWTH IN A POLYMER WITH XYLENE

| Days Aged | Viscosity, cp Control (NO Additive) | Voscosity, cp 1,000 gm/m³ Xylene | Viscosity, cp 3,000 gm/m³ Xylene |
|---|---|---|---|
| 0 | 36.6 | 37.4 | 36.2 |
| 5 | 21.6 | 36.4 | 36.8 |

It can be seen from the foregoing that in only five days, the polymer solution without xylene experienced a drop in viscosity from 36.6 to 21.6, a loss of 41% of its initial viscosity. The sample containing 1,000 gm/m³ xylene experienced only negligible, approximately 3.6% lose in viscosity in the same five day interval. The sample containing 3,000 gm/m³ xylene lost essentially no viscosity, indicating inhibition of microbial attack was complete. It is concluded from this series of tests that xylene is a very effective material for inhibiting the degradation of Xanflood® polymer by microbial action as is evidenced by degradation in viscosity.

Another series of tests were conducted to determine the effectiveness of toluene for inhibiting loss of viscosity due to microbial attack on a commercially available, partially hydrolyzed polyacrylamide. The polymer investigated was Cyanatrol WF 940S® a hydrolyzed polyacrylamide available from American Cyanamid Corporation.

The fluid was prepared by dissolving the partially hydrolyzed polyacrylamide in a mixture of produced water and field water, which mixture had a salinity of 3400 parts per million total dissolved solids. The fluid contained 1,000 gm/m³ Cynatrol®. One sample was prepared without a stabilizing additive for use as a control, and another sample contained one cubic centimeter toluene per 1,000 cubic centimeters of fluid (equivalent to 1000 parts per million toluene). The viscosity and screen factor of the fluids were determined initially and again after the fluids had been aged for three weeks at ambient laboratory temperature. The data are contained in Table II below.

TABLE II

THE EFFECTIVENESS OF TOLUENE AS A BACTERACIDE FOR PARTIALLY HYDROLYZED ACRYLAMIDE

| | VISCOSITY cp at 6 rpm | | SCREEN FACTOR | |
|---|---|---|---|---|
| SAMPLE | Initial | After 3 wks | Initial | After 3 wks |
| CONTROL | 32 | 11.5 | 17.0 | 8.9 |
| 1000 gm/m³ Toluene | 33 | 32 | 17.0 | 16.9 |

It can be seen from the above data that toluene was essentially completely effective during a three week aging period for stabilizing both viscosity and the screen factor, whereas without additive, the viscosity of an otherwise identical fluid dropped from 32 to 11.5 centipoise, a drop of 64% and the screen factor dropped from 17 to 8.9, a drop of about 48%.

Another series of tests were conducted to verify the effectiveness of toluene as a bactericide for use in combination with partially hydrolyzed polyacrylamide polymer under conditions approximating that which would be experienced in the field. Solutions containing 1000 gm/m³ Cyantrol® and 1000 gm/m³ toluene were prepared in field water whose salinity was approximately 3400 parts per million total dissolved solids. The viscosity and screen factor of the toluene-protected polymer solution was determined initially, as well as after aging 14 days and 30 days at 49° C. (120° F.). The data observed in this series of tests are presented below.

TABLE III

| Days Aged at 49° C. | Viscosity mPa's (cP) at 10rpm | Screen Factor |
|---|---|---|
| 0 | 30.3 | 14.6 |
| 14 | 30.1 | 12.8 |
| 30 | 33.1 | 12.9 |

It can be seen from the foregoing data that toluene was essentially completely effective for preserving viscosity and screen factor values of the fluid over the 30 day period at the elevated temperatures, since no loss in viscosity was experienced and in fact a slight increase was observed, although this difference is within the limits of experimental error in determining viscosity. The screen factor declined only very little from 0 to 14 days, and experienced no loss from 14 to 30 days, indicating excellent stability of the screen factor as well as viscosity.

Still another experiment was conducted to evaluate the effectiveness of toluene as an inhibitor to prevent the loss of viscosity, screen factor, and possibly other physical properties as a result of biological degradation of a partially hydrolyzed polyacrylamide polymer. In these tests, several samples of solution were prepared containing 1000 parts per million Cyanatrol®, a commercially available polyacrylamide sold by American Cyanamid. One sample was not treated with a bactericide, to serve as a control to the other experiments. The second sample was treated with 150 gm/m$^3$ of Dowicide B®, a commercially available bactericide sold by Dow Chemical Company for use as a bacterial inhibitor for polyacrylamide. The third was treated with 1000 gm/m$^3$ toluene. The observed data are shown below.

TABLE IV

EFFECTIVENESS OF TOLUENE AS A BACTERICIDE FOR POLYACRYLAMIDE

| TIME Weeks | CONTROL | | DOWICIDE B® | | TOLUENE | |
|---|---|---|---|---|---|---|
| | Viscosity | Screen Factor | Viscosity | Screen Factor | Viscosity | Screen Factor |
| 0 | 30.3 | 14.6 | 37.0 | 15.2 | 28.5 | 14.4 |
| 1 | 17.5 | — | — | — | — | — |
| 4 | 11.7 | 3.0 | 28.1 | 14.3 | 30.4 | 14.0 |
| 6 | 3.3 | 1.8 | 28.7 | 13.3 | 27.7 | 13.4 |

It can be seen from the above the severe loss in both viscosity and screen factor of the control sample containing no toluene or other bactericide indicates the severity of the problem of microbial degradation. Dowicide B provided good stability although the viscosity of the sample treated with Dowicide B® dropped from 37.0 to 28.8, a lose of 22%. A slight drop in screen factor was also observed. The sample treated with toluene experienced a drop in viscosity from 28.5 to 27.7, less than a 3% decrease. The screen factor similarly declined from 14.4 to 13.4, a decline of less than 7%.

The foregoing indicates that toluene is an extremely effective inhibitor for preventing loss of viscosity and screen factor, as well as deterioration of other physical properties in the polymer solution as result of bacterial attack. While the concentration level for treatment of Dowicide B® was considerably less than the treatment level of toluene employed, the cost of treating a solution under field conditions with 150 gm/m$^3$ Dowicide B® would be approximately $135.00 per 1000 barrels of polymer fluid, versus only $23.00 for treating the same volume of polymer fluid with 1000 parts per million toluene. Accordingly, it can be seen that the process of this invention provides substantially improved cost effectiveness for treating polymer solutions to prevent loss of physical properties due to bacterial attack.

Another series of tests were performed to determine the effect of variations in concentration of toluene on its effectiveness for stabilizing Xanflood® polymer against loss of filterability and viscosity as a result of microbial attack. All of the solutions contained 1000 parts per million polymer prepared in dionized water, plus the indicated amount of toluene. The samples were aged at room temperature for the periods indicated and the presence of microbial growth was detected qualitatively based on visual observation, odor, etc. The data are contained in Table V below.

TABLE V

TOLUENE CONCENTRATION EFFECT

| Concentration of Toluene gm/m$^3$ | Days Aged | | |
|---|---|---|---|
| | 3 | 10 | 24 |
| 0(control) | + | + | + |
| 25 | + | + | + |
| 50 | + | + | + |
| 100 | + | + | + |
| 500 | +/− | + | + |
| 1000 | — | — | — |
| 2000 | — | — | — |
| 3000 | — | — | — |
| 6000 | — | — | — |

+ = microbial growth observed
− = no visible sign of microbial growth

It can be seen from the data contained in Table V above that toluene is ineffective under these conditions of polymer concentration and salinity below about 500 parts per million. Above 500 parts per million, toluene was quite effective for preventing microbial growth over the time period of these tests. The minimum concentration of toluene needed for bactericidal action depends on the particular polymer and brine, and protection is observed under other conditions at concentration far below 500 parts per million. It is encouraging that over treatment causes no adverse effects, although ordinarily the preferred method of applying the invention is to use only as much toluene as is necessary to achieve the desired protection against microbial decomposition under the conditions and for the time for which the polymer containing fluid will be present in the formation.

Another series of tests were performed to compare performance of various levels of toluene treatment in fresh water and brine (111,000 ppm total dissolved solids.) In these tests, the toluene was added to a 1% polymer concentrate, and aged 24days. Diluted samples were then prepared and the physical properties measured. The data are given in Table VI below.

TABLE VI

COMPARISON OF EFFECTIVENESS OF TOLUENE AS BACTERICIDE IN FRESH WATER AND BRINE POLYMER SOLUTION

| Toluene Content | Days Aged | Fresh Water | | | Brine | | |
|---|---|---|---|---|---|---|---|
| | | Filt.[1] | Visc.[2] | Apr.[3] | Filt.[1] | Visc.[2] | Apr.[3] |
| 0 | 0 | 86 | 31.3 | b | 69 | 35 | b |
| 0 | 24 | — | 1.4 | a | — | 1.6 | a |
| 1000 | 24 | 133 | 30.9 | c | 124 | 36 | C |
| 2000 | 24 | — | — | | 116 | 35.6 | c |
| 3000 | 24 | — | — | — | 90 | 36.9 | d |
| 6000 | 24 | — | — | — | 64 | 35 | e |

[1]Filt. = volume (cc) filtered in 300 sec through 0.8 micron filter with 20 psi pressure
[2]Visc. = viscosity measured at 7.3 sec$^{-1}$ (6 rpm) at ambient temperature
[3]Apr. = appearance:
a = precipitate
b = slightly cloudy
c = very clear
d = clear
e = cloudy It can be seen from the foregoing that viscosity and filterability, 1000 parts per million toluene is adequate concentration to prevent loss of physical properties due to microbial attach in fresh water. In the polymer fluid prepared in brine, excellent stabilization of viscosity characteristics occurred in all four treating levels. The cloudy appearance of the brine fluids treated with 6000 parts per million toluene suggests that this treatment level is excessive for these conditions.

CONCLUSION

The use of from 10 to 2000 and preferably from 50 to 1500 parts per million of an aromatic treating agent, preferably benzene, toluene, xylene, or short alkyl chain substituted benzene or toluene effectively reduces lose of viscosity and screen factor of a hydrophilic polymer-containing solution due to microbial action under relatively long term aging conditions.

While this invention has been described in terms of a number of illustrative embodiments, this is done for the purpose of complete disclosure and is not intended to be in any way limitative or restrictive of the scope of the invention. Many variations will become apparent to persons skilled in the art of oil recovery, without departing form the true spirit and scope of this invention. It is my intention that may invention be limited and restricted only by those limitations and restrictions appearing in the claims appended immediately hereinafter below.

I claim:

1. A method of recovering oil from a subterranean, permeable, oil-containing formation penetrated by at least one injection well, and by at least one production well, both wells being in fluid communication with the formation, comprising injecting an aqueous fluid containing a viscosifying amount of a hydrophilic polymer, wherein the improvement comprises:

incorporating in the fluid a bactericidal amount in the range of from 10 to 2000 parts per million of an aromatic treating compound having the following formula:

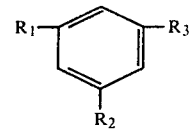

wherein $R_1$, $R_2$ and $R_3$ are each hydrogen or $C_1$-$C_5$ alkyl with the total number of carbon atoms in $R_1$, $R_2$ and $R_3$ being from 0 to 5.

2. A method as recited in claim 1 wherein the concentration of aromatic treating compound is from 50 to 1500 parts per million.

3. A method as recited in claim 1 wherein $R_1$, $R_2$ and $R_3$ are each $C_1$-$C_3$ alkyl.

4. A method as recited in claim 1 wherein the aromatic treating compound is selected from the group consisting of benzene, ethyl benzene, propyl benzene, butyl benzene, toluene, ethyl toluene, butyl toluene, propyl toluene, xylene and mixtures thereof.

5. A method as recited in claim 4 wherein the treating compound is toluene, xylene or a mixture thereof.

6. A method is recited in claim 4 wherein the fluid also contains a surfactant.

7. A method as recited in claim 1 wherein the hydrophilic polymer is partially hydrolyzed polyacrylamide, a co-polymer of acrylamide and acrylic acid, a polysaccharide, a naturally occurring polymer, or a mixture thereof.

8. A method as recited in claim 1 wherein the aqueous fluid contains at least 500 parts per million of the aromatic treating compound.

9. A method as recited in claim 1 wherein the aromatic treating compound is added to the polymer fluid prior to injecting it into the formation.

10. A method as recited in claim 1 wherein the aromatic treating compound is added to water used to prepare the polymer-containing fluid prior to adding the polymer thereto.

11. A method as recited in claim 1 wherein the polymer and aromatic treating compound are added to water simultaneously.

* * * * *